United States Patent
Harper

(10) Patent No.: US 10,580,443 B2
(45) Date of Patent: *Mar. 3, 2020

(54) PLANAR MONO COIL FOR TWO STAGE HEAD ACTUATOR

(71) Applicant: International Business Machines Corporation, Armonk, NY (US)

(72) Inventor: David H. F. Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,800

(22) Filed: Jan. 16, 2019

(65) Prior Publication Data
US 2019/0147910 A1    May 16, 2019

Related U.S. Application Data

(63) Continuation of application No. 14/864,816, filed on Sep. 24, 2015, now Pat. No. 10,236,023.

(51) Int. Cl.
*G11B 5/56* (2006.01)
*G11B 5/584* (2006.01)
*G11B 5/008* (2006.01)

(52) U.S. Cl.
CPC .......... *G11B 5/584* (2013.01); *G11B 5/00826* (2013.01); *G11B 5/56* (2013.01)

(58) Field of Classification Search
CPC .................................. G11B 5/584; G11B 5/56
USPC ...................... 360/261, 261.1, 291
See application file for complete search history.

(56) References Cited

U.S. PATENT DOCUMENTS

| | | |
|---|---|---|
| 6,594,118 B1 | 7/2003 | Nayak et al. |
| 6,922,301 B1 | 7/2005 | Wittig et al. |
| 7,359,160 B2 | 4/2008 | Koga et al. |
| 7,474,495 B2 | 1/2009 | Weng et al. |

(Continued)

OTHER PUBLICATIONS

Cherubini et al., "Initial resolution of head position and skew uncertainty in control systems for flangeless tape drives," 51st IEEE Conference on Decision and Control, Dec. 10-13, 2012, pp. 5052-5058.

(Continued)

*Primary Examiner* — Jefferson A Evans
(74) *Attorney, Agent, or Firm* — Zilka-Kotab, P.C.

(57) ABSTRACT

A computer program product, according to one embodiment, includes a computer readable storage medium having program instructions embodied therewith. The program instructions are readable and/or executable by a controller to cause the controller to: determine first and second currents to apply to an actuator assembly in response to detecting a track following error. The first and second currents are applied to the actuator assembly simultaneously. The actuator assembly itself includes: a fine motion motor for enabling positioning of a beam of a head carriage assembly. The actuator assembly also includes a skew motion motor for enabling rotatable positioning of the head carriage assembly about an axis of skew. Furthermore, the actuator assembly includes a main coil configured to induce skew motion and lateral motion of the beam of the head carriage assembly relative to the fine motion motor and the skew motion motor upon energization of the main coil.

20 Claims, 11 Drawing Sheets

(56) References Cited

U.S. PATENT DOCUMENTS

| | | |
|---|---|---|
| 7,679,864 B2 | 3/2010 | Nayak et al. |
| 7,944,649 B2 | 5/2011 | Yeakley et al. |
| 7,957,088 B1 | 6/2011 | Bui et al. |
| 8,035,926 B2 | 10/2011 | Harper |
| 8,059,355 B2 | 11/2011 | Nayak et al. |
| 8,139,318 B2 | 3/2012 | Biskeborn |
| 8,526,138 B2 | 9/2013 | Biskeborn et al. |
| 8,643,975 B2 | 2/2014 | Cherubini et al. |
| 9,355,663 B1 | 5/2016 | Harper et al. |
| 9,466,334 B1 | 10/2016 | Biskeborn et al. |
| 9,892,751 B1 | 2/2018 | Harper |
| 10,236,023 B2 | 3/2019 | Harper |
| 2001/0015870 A1 | 8/2001 | Saliba |
| 2002/0186496 A1 | 12/2002 | Saliba et al. |
| 2003/0151845 A1 | 8/2003 | Koganezawa et al. |
| 2005/0201017 A1 | 9/2005 | Koga et al. |
| 2006/0103968 A1 | 5/2006 | Jurneke |
| 2006/0126212 A1 | 6/2006 | Anderson et al. |
| 2007/0279806 A1 | 12/2007 | Ycas |
| 2007/0285845 A1* | 12/2007 | Nayak .................. G11B 5/584 360/261.1 |
| 2008/0174919 A1* | 7/2008 | White ................ G11B 5/4826 360/260 |
| 2010/0067139 A1 | 3/2010 | Bates et al. |
| 2010/0214688 A1 | 8/2010 | Biskeborn et al. |
| 2015/0116866 A1 | 4/2015 | Yeakley et al. |
| 2015/0248915 A1 | 9/2015 | Haeberle et al. |
| 2017/0076746 A1 | 3/2017 | Harper et al. |
| 2017/0092312 A1 | 3/2017 | Harper |
| 2017/0148476 A1 | 5/2017 | Harper et al. |

OTHER PUBLICATIONS

Harper, D., U.S. Appl. No. 14/864,816, filed Sep. 24, 2015.
Restriction Requirement from U.S. Appl. No. 14/864,816, dated Jan. 25, 2018.
Ex Parte Quayle from U.S. Appl. No. 14/864,816, dated May 14, 2018.
Notice of Allowance from U.S. Appl. No. 14/864,816, dated Oct. 31, 2018.
List of IBM Patents or Patent Applications Treated as Related.

* cited by examiner

PLANAR MONO COIL FOR TWO STAGE HEAD ACTUATOR

BACKGROUND

The present invention relates to data storage systems, and more particularly, this invention relates to multiple degree of freedom actuator assemblies having a coil configured to induce motion of a head in the multiple degrees of freedom.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. In a tape drive system, the drive moves the magnetic tape over the surface of the tape head at high speed. Moreover, read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

BRIEF SUMMARY

A computer program product, according to one embodiment, includes a computer readable storage medium having program instructions embodied therewith. The program instructions are readable and/or executable by a controller to cause the controller to: determine, by the controller, first and second currents to apply to an actuator assembly in response to detecting a track following error. Moreover, the first and second currents are applied, by the controller, to the actuator assembly simultaneously. The actuator assembly itself includes: a fine motion motor for enabling positioning of a beam of a head carriage assembly along a fine motion direction, where the fine motion direction is oriented perpendicular to an intended direction of media movement. The actuator assembly also includes a skew motion motor for enabling rotatable positioning of the head carriage assembly about an axis of skew which extends perpendicular to a plane defined by the intended direction of media movement across the head carriage assembly and the fine motion direction. Furthermore, the actuator assembly includes a main coil configured to induce skew motion and lateral motion of the beam of the head carriage assembly relative to the fine motion motor and the skew motion motor upon energization of the main coil. It should also be noted that the first current is applied to the main coil.

A controller-implemented method, according to another embodiment, includes: determining first and second currents to apply to an actuator assembly in response to detecting a track following error, and applying the first and second currents to the actuator assembly simultaneously. The actuator assembly includes: a fine motion motor for positioning a beam of a head carriage assembly along a fine motion direction, where the fine motion direction is oriented perpendicular to an intended direction of media movement. The actuator assembly also includes a skew motion motor for rotatably positioning the head carriage assembly about an axis of skew which extends perpendicular to a plane defined by the intended direction of media movement across the head carriage assembly and the fine motion direction. Furthermore, the actuator assembly includes a main coil configured to induce skew motion and lateral motion of the beam of the head carriage assembly relative to the fine motion motor and the skew motion motor upon energization of the main coil. It should also be noted that the first current is applied to the main coil.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
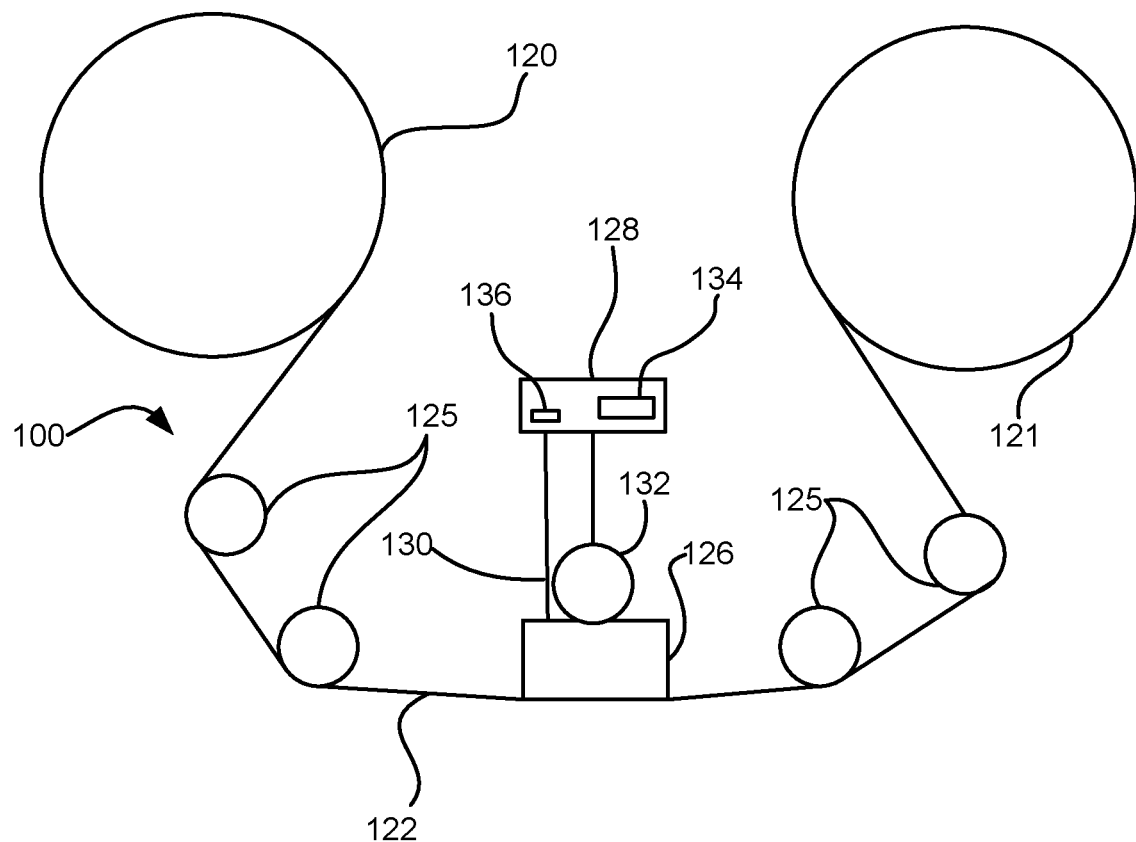
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes: a head carriage assembly having a beam for coupling to a magnetic head, and an actuator assembly coupled to the beam of the head carriage assembly. The actuator assembly includes: a fine motion motor for enabling positioning of the beam of the head carriage assembly along a fine motion direction, the fine motion direction being oriented perpendicular to an intended direction of media movement, a skew motion motor for enabling rotatable positioning of the head carriage assembly about an axis of skew which extends perpendicular to a plane defined by the intended direction of media movement across the head carriage assembly and the fine motion direction, and a main coil configured to induce skew motion and lateral motion of the beam of the head carriage assembly relative to the fine motion motor and the skew motion motor upon energization of the main coil by applying current thereto.

In another general embodiment, a computer program product includes a computer readable storage medium having program instructions embodied therewith, wherein the computer readable storage medium is not a transitory signal per se, the program instructions readable and/or executable by a controller to cause the controller to perform a method which includes: detecting, by the controller, a track following error, determining, by the controller, a first current to apply to an actuator assembly in response to detecting a track following error, determining, by the controller, a second current to apply to the actuator assembly based on the track following error and the first current, and applying, by the controller, the first and second currents to the actuator assembly simultaneously. The actuator assembly includes: a fine motion motor for enabling positioning of a beam of a head carriage assembly along a fine motion direction, the fine motion direction being oriented perpendicular to an intended direction of media movement, a skew motion motor for enabling rotatable positioning of the head carriage assembly about an axis of skew which extends perpendicular to a plane defined by the intended direction of media movement across the head carriage assembly and the fine motion direction, and a main coil configured to induce skew motion and lateral motion of the beam of the head carriage assembly relative to the fine motion motor and the skew motion motor upon energization of the main coil. Moreover, the first current is applied to the main coil.

In yet another general embodiment, a controller-implemented method includes: detecting a track following error, determining a first current to apply to an actuator assembly in response to detecting a track following error, determining a second current to apply to the actuator assembly based on a portion of the track following error and the first current, and applying the first and second currents to the actuator assembly simultaneously. The actuator assembly includes: a fine motion motor for positioning a beam of a head carriage assembly along a fine motion direction, the fine motion direction being oriented perpendicular to an intended direction of media movement, a skew motion motor for rotatably positioning the head carriage assembly about an axis of skew which extends perpendicular to a plane defined by the intended direction of media movement across the head carriage assembly and the fine motion direction, and a main coil configured to induce skew motion and lateral motion of the beam of the head carriage assembly relative to the fine motion motor and the skew motion motor upon energization of the main coil. Moreover, the first current is applied to the main coil.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits which transmit data to the head 126 to be recorded on the tape 122 and which receive data read by the head 126 from the tape 122. Moreover, an actuator assembly 132 controls a position of the head 126 relative to the tape 122. The actuator assembly 132 may include a coarse actuator, fine actuator, worm screw, springs, etc. depending on the desired embodiment. According to some exemplary embodiments, the actuator assembly 132 may include one or more components which enable multiple degrees of freedom for the head 126 relative to the tape 122, as will be described in further detail below, e.g., see FIGS. 8A-10.

Referring still to FIG. 1A, an interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
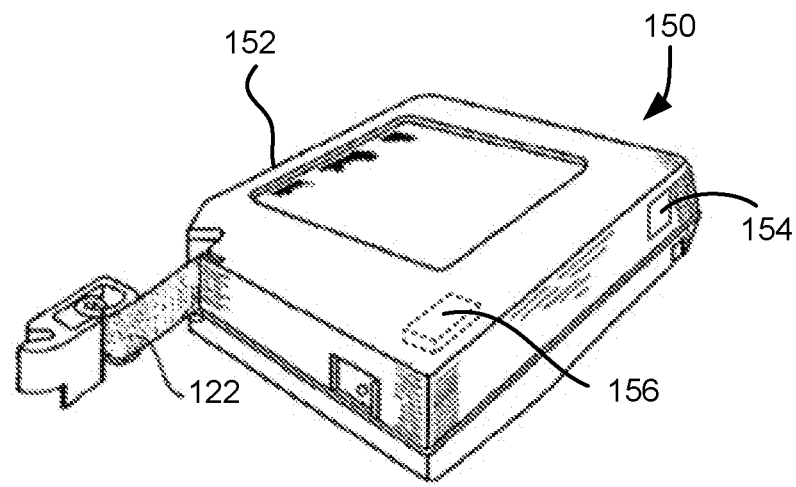
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
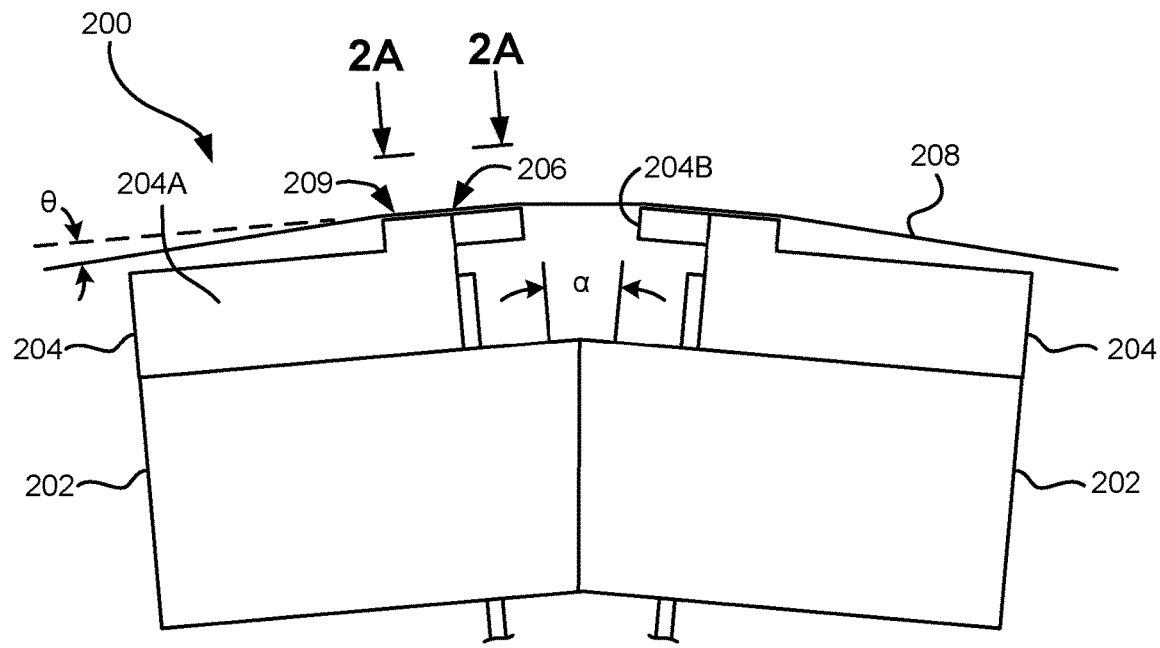
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
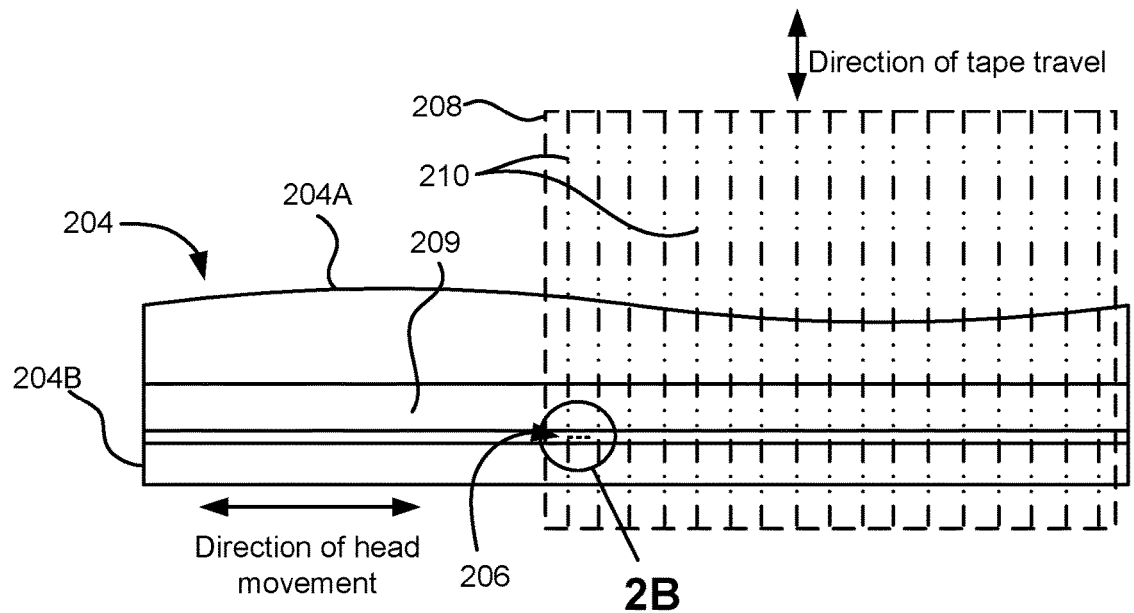
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
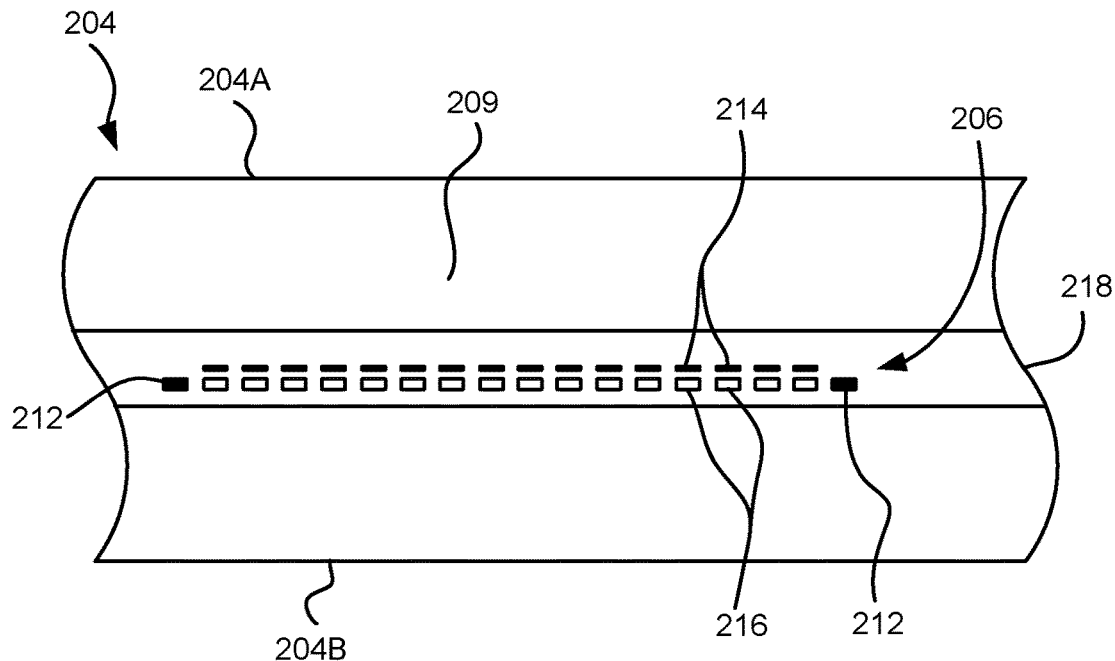
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
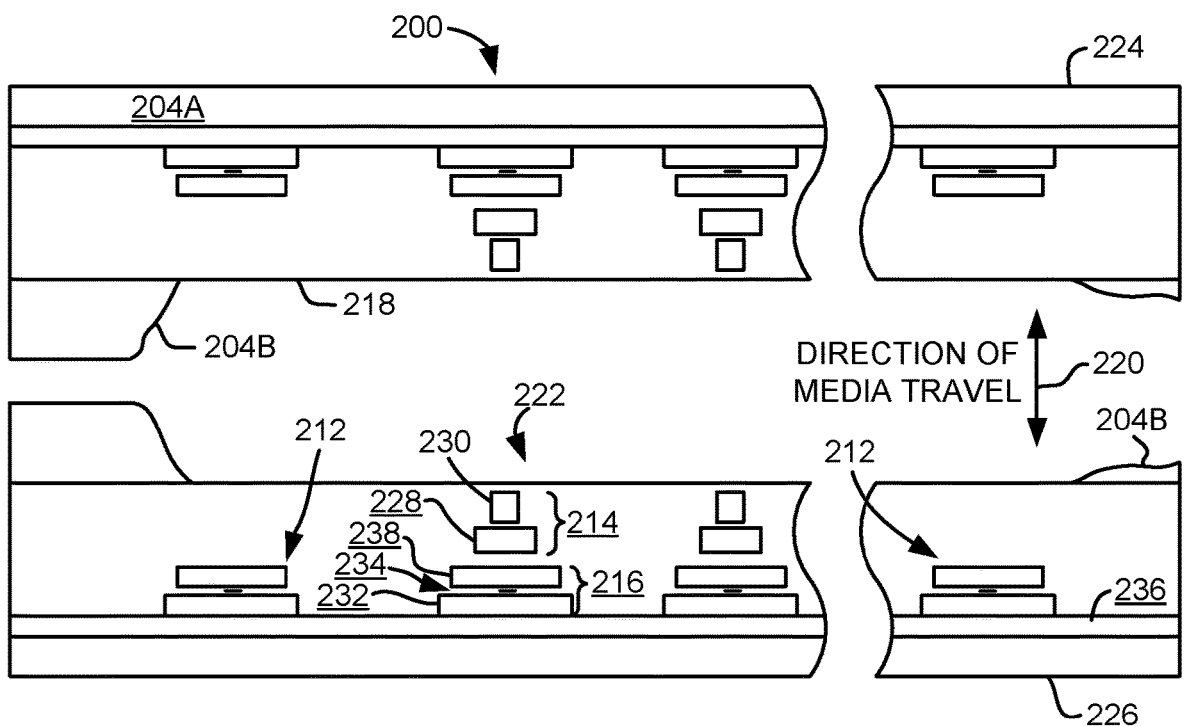
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of movement of a tape medium thereacross to form an R/W pair, exemplified by the R/W pair 222. Note that the intended direction of tape movement is also referred to herein as an "intended direction of tape travel" and sometimes referred to herein as the direction of tape travel; accordingly such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
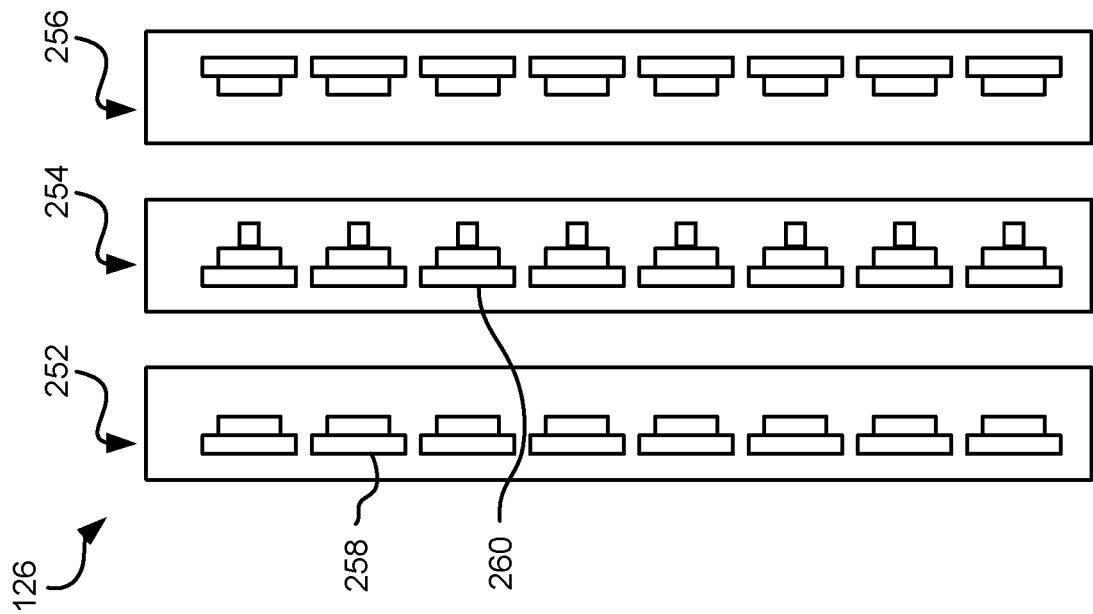
FIG. 4 is a partial tape bearing surface view of a magnetic head having a read-write-read configuration.
Figure 3:
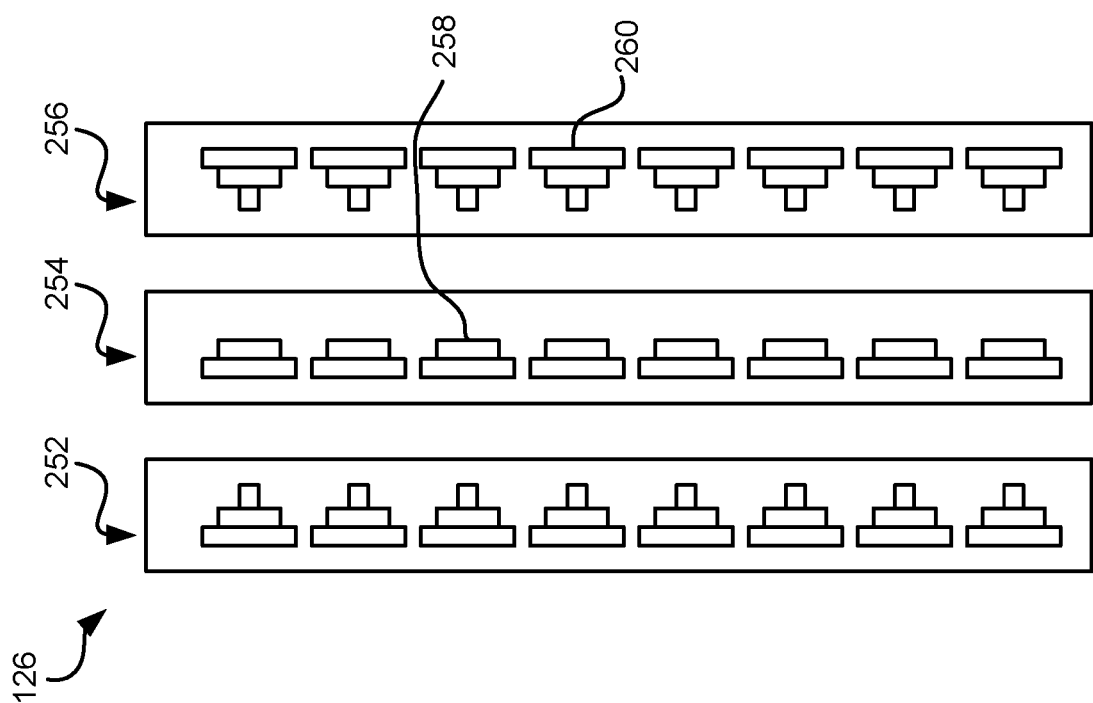
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
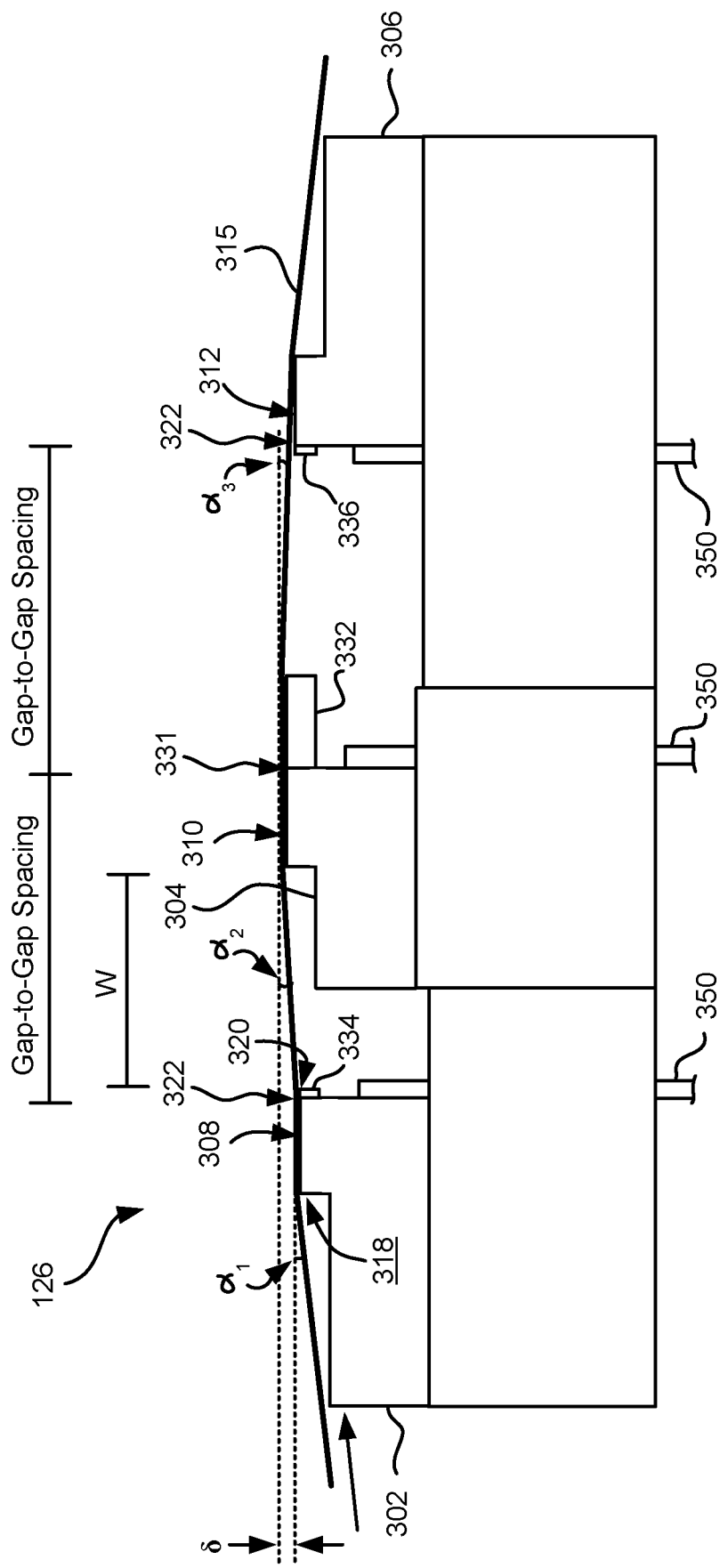
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
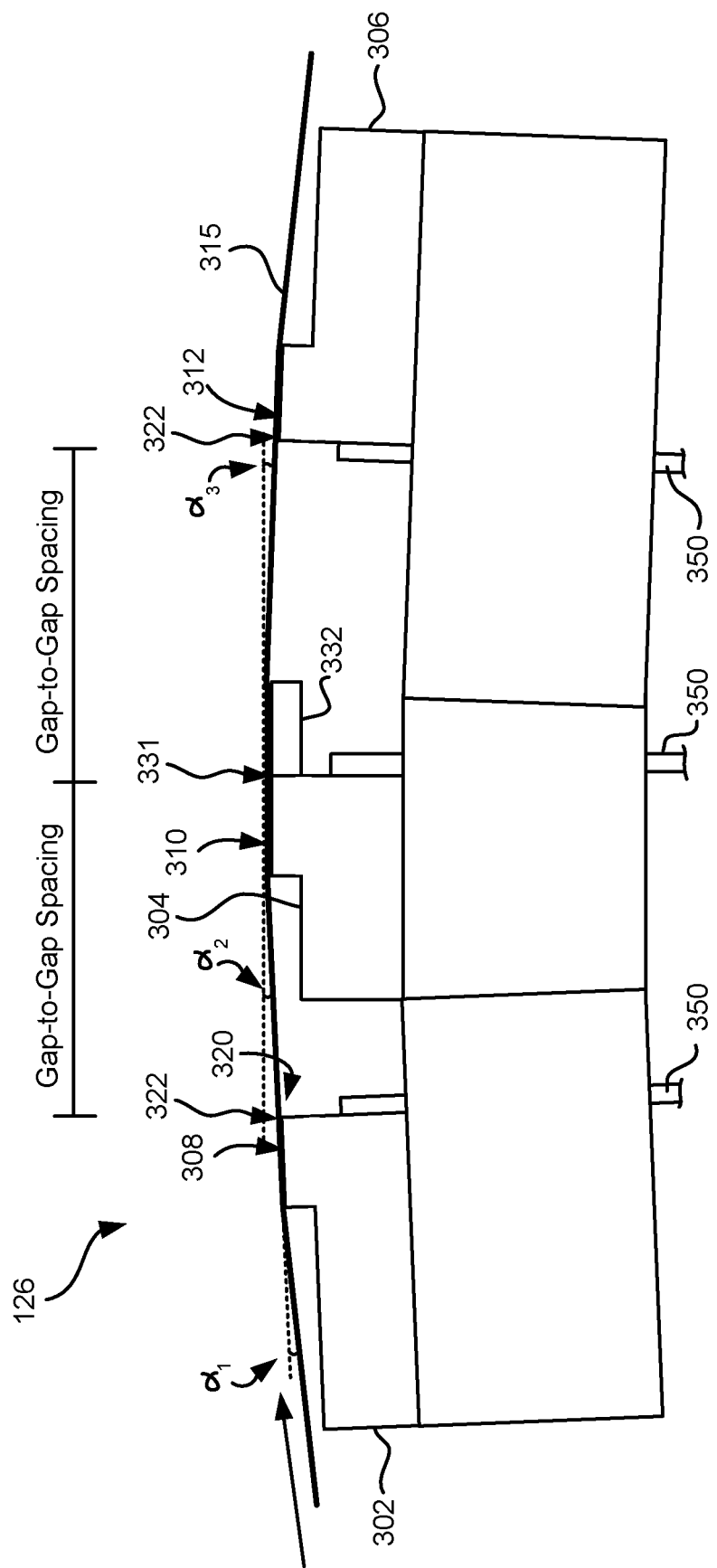
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
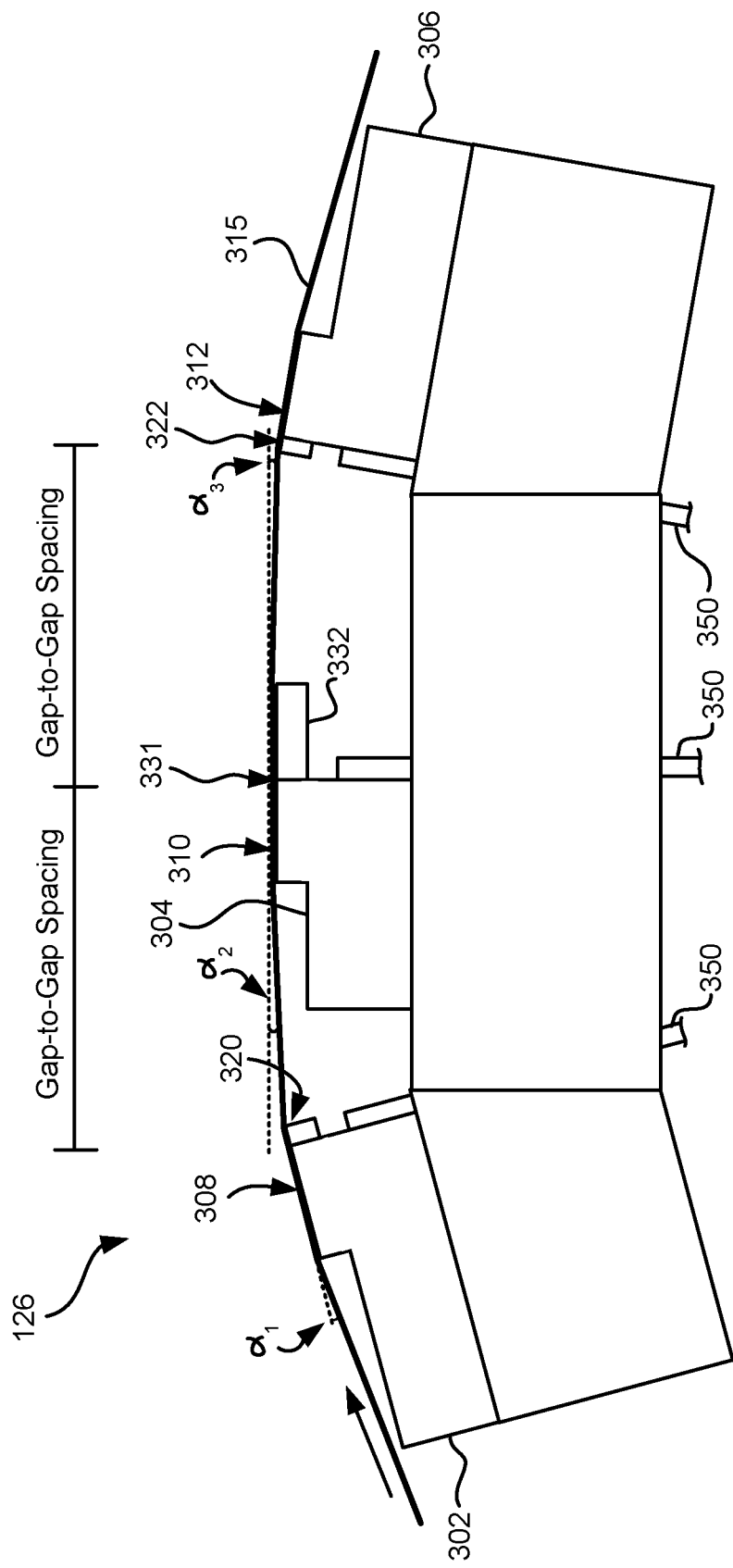
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, actuator assemblies may have multiple degrees of freedom. Such actuators may be able to selectively adjust the orientation and/or position of a magnetic head with respect to a magnetic medium during operation thereof. Accordingly, actuator assemblies having control over multiple degrees of freedom may be able to compensate for various operational conditions, e.g., tape skew, tape shifting, etc.

Accordingly, a head actuator motor may be used to cause a head to track follow, or follow the lateral tape motion during operation. This may be achieved by passing current through a coil that resides in the main magnet pole piece assembly, which generates forces that may be utilized to produce vertical motion (in the cross-track direction) of the head, e.g., for track following. Skew following is also a desirable ability of a given system, e.g., to ensure that the array of transducers on the head is perpendicular to the intended direction of tape travel. The relative skew angle of a tape being accessed may dynamically change during operation, especially where the tape path is flangeless, thereby allowing the tape to wander as it is transferred from the supply reel to the take up reel, or vice-versa, as would be appreciated by one skilled in the art.

Previous attempts to provide multiple degrees of freedom implemented a coil for each of the degrees of freedom to induce such movement. Specifically, a second coil and a second set of magnet sub-assemblies were used to enable skew following in addition to track following. However, the second coil and second set of magnet sub-assemblies coupled to the head adds to the overall moving mass of the head assembly and thereby adversely affects the acceleration achievable, and in some cases limiting the bandwidth of the system due to the slow response time.

In sharp contrast, various embodiments described herein introduce a number of actuator configurations which achieve multiple directions of motion using only a single coil assembly coupled directly to the head carriage assembly, thereby desirably improving performance.

Figure 8A:
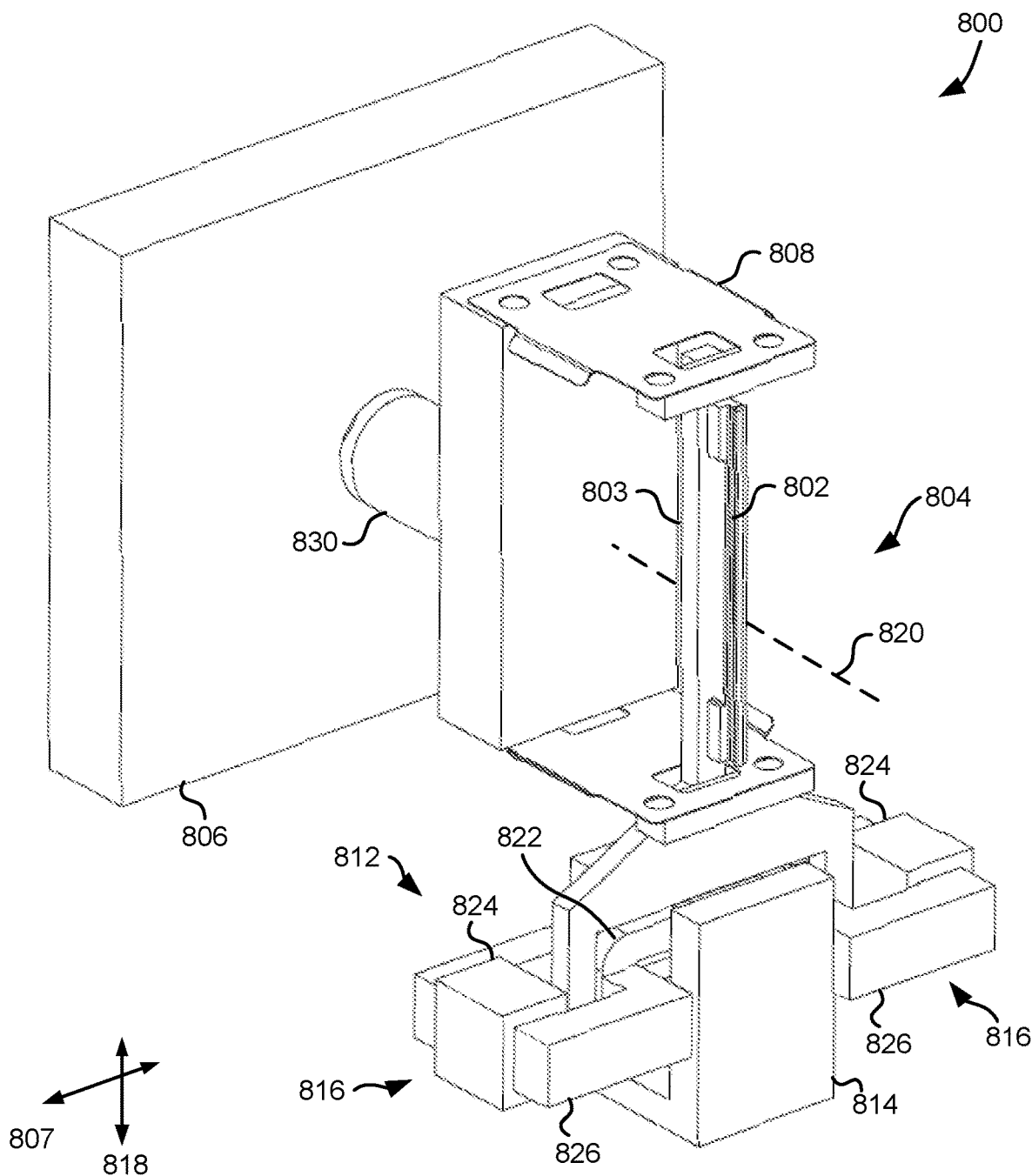
FIG. 8A is partial perspective view of an apparatus according to one embodiment.
Figure 8B:
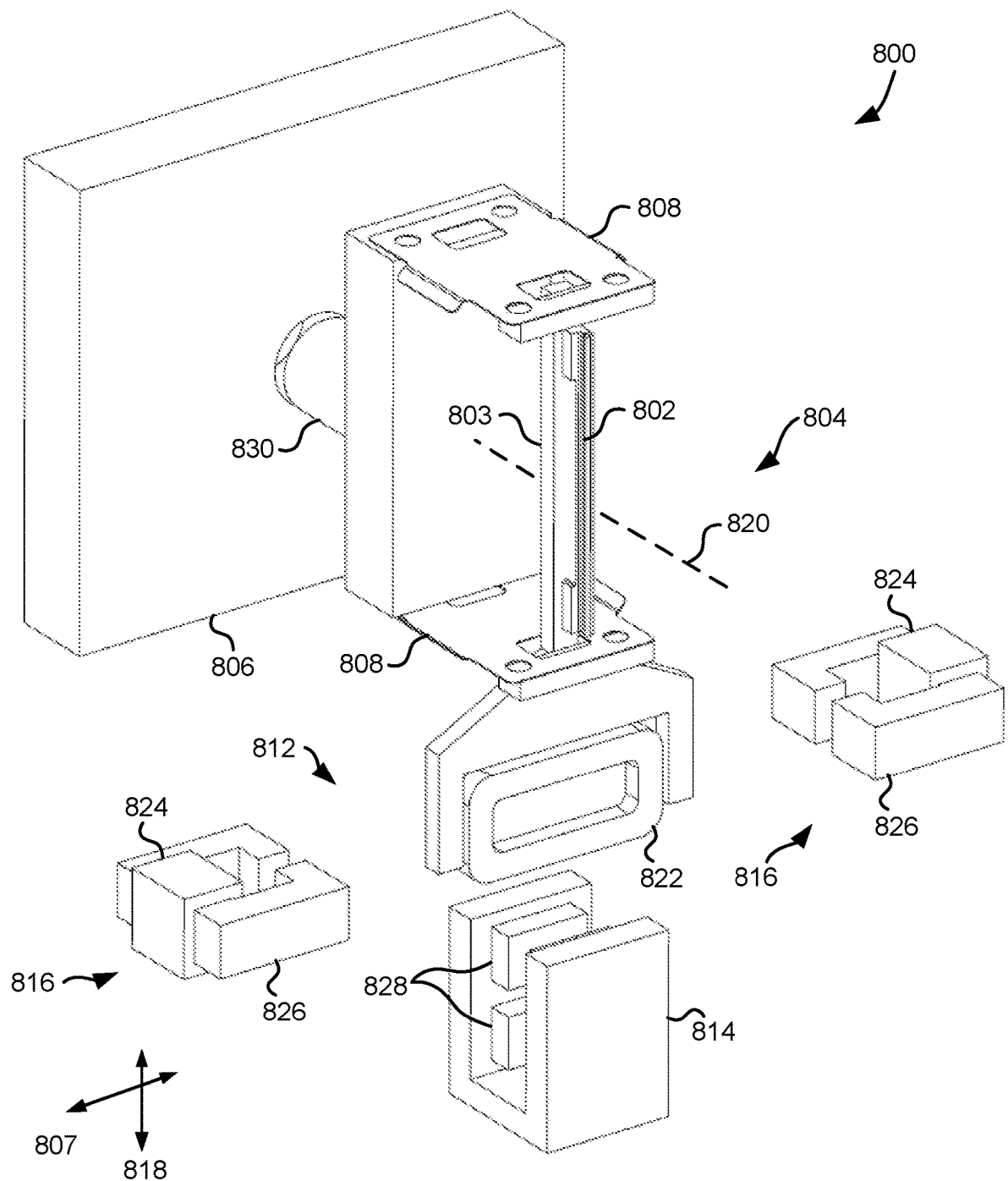
FIG. 8B is an exploded view of the apparatus from FIG. 8A.

FIGS. 8A-8B depict an apparatus 800, in accordance with one embodiment. As an option, the present apparatus 800 may be implemented in conjunction with features from any other embodiment listed herein, such as those described with reference to the other FIGS., such as FIGS. 1A-7. However, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8B (and the other FIGS.) may be deemed to include any possible permutation.

Referring now to FIGS. 8A-8B, apparatus 800 includes a head carriage assembly 804 having a beam 803. The beam 803 may be used to hold a magnetic head 802, e.g., by coupling the magnetic head 802 thereto as shown. The head carriage assembly 804 enables positioning of the magnetic head 802 such that it is presented to a magnetic medium passing thereover. Accordingly, magnetic head 802 may include read and/or write transducers, e.g., according to any of the approaches described above. Moreover, in some embodiments, a controller (not shown) may be coupled to, or be part of, apparatus 800. Depending on the desired approach, the controller (e.g., see 128 of FIG. 1A) may be able to perform any one or more of the operations described below with reference to FIG. 10.

Apparatus 800 of FIGS. 8A-8B further includes a linear assembly 806 which is configured to move along the fine motion direction 818, e.g., upon movement thereof by a coarse actuator (not shown), e.g., of a type known in the art. As shown, fine motion flexures 808 may be used to couple the head carriage assembly 804 to the linear assembly 806. Fine motion flexures 808 are preferably configured to prevent pitching motion of the head carriage assembly 804 relative to the linear assembly 806 while preserving movement of the head carriage assembly in the fine motion direction 818. In other approaches, additional flexures may be coupled to the head carriage assembly 804 and/or the linear assembly 806 to further control (improve) the relative motion between the various components, as would be appreciated by one skilled in the art upon reading the present description.

Moreover, an actuator assembly 812 is coupled to the beam 803 of the head carriage assembly 804. Actuator assembly 812 includes fine motion motor 814 as well as two skew motion motors 816. As shown, the two skew motion motors 816 are positioned on opposite sides of a main coil 822 of the actuator assembly 812 relative to each other along an intended direction of media movement 807. However, it should be noted that although two skew motion motors 816 are included in the present embodiment, in other embodiments only one skew motion motor 816 may be included, e.g., depending on a desired amount of skew motion, a weight of the head carriage assembly 804, a velocity of tape implemented during run time, etc.

As their names suggest, fine motion motor 814 may be used to enable positioning of the beam 803 of the head carriage assembly 804 along a fine motion direction 818, while skew motion motors 816 may be used in cooperation with pivot pin 830 to enable rotatable positioning of the head carriage assembly about an axis of skew 820. As illustrated in FIGS. 8A-8B, the "axis of skew" 820 is intended to extend perpendicular to a plane defined by an intended direction of media movement 807 across the head carriage assembly 804, and a fine motion direction 818 of the head carriage assembly 804. Moreover, the direction of fine motion (fine motion direction 818) is oriented about perpendicular to the intended direction of media movement 807 such that a position of the head carriage assembly 804 relative to the data tracks of a magnetic tape being passed thereover may be adjusted as desired, e.g., for track following, to compensate for shifting of the tape during operation, etc.

Referring still to apparatus 800, the main coil 822 (e.g., main planar coil) is a single coil assembly coupled to the head carriage assembly 804. The single coil assembly constituting the main coil may be a collection of turns of a conductor or plurality of conductors in which the electrical current flows in parallel through said turns and cooperatively couple with a magnetic field. For example, the main coil 822 may be a wire wrapped a plurality of times around a spool. In another approach, multiple wires may be wrapped around the spool, thereby creating a single coil assembly. The main coil 822 may be coupled to a controller that controls a current passing therethrough in operation.

Main coil 822 is preferably configured to induce both fine motion (lateral motion in the cross-track direction) and skew motion of the beam 803 of the head carriage assembly 804 relative to a magnetic medium upon energization thereof. Thus, the main coil 822 may be positioned such that the forces generated by the currents passing therethrough when energized control the position of the head carriage assembly 804 in multiple degrees of freedom. Specifically, upon energization of the main coil 822, and coupling with a magnetic field, a force is generated and thereby applied to the fine motion motor 814 and the skew motion motors 816, which are energized separately, thereby inducing motion in the fine motion direction 818 and about the axis of skew 820 respectively. Accordingly, various embodiments described herein are desirably able to allow for motion to occur in both the fine motion direction 818 and about the axis of skew 820, thereby achieving multiple directions of motion using only a single coil assembly, as mentioned above.

Looking to the specific embodiment illustrated in FIGS. 8A-8B, skew motion motors 816 are shown as each including a supplemental coil 824 and a pole piece 826 while the fine motion motor 814 includes hard magnets 828 and no coil. Depending on the desired approach, hard magnets 828 may include any magnetic material which would be apparent to one skilled in the art upon reading the present description. Moreover, the supplemental coil 824 and pole piece 826 are preferably configured to induce the skew motion independent of the fine motion, as will soon become apparent.

According to an example, which is in no way intended to limit the invention, a current may be passed through the main coil 822 to generate forces along the fine motion direction 818 for track following during operation. Thus, the current passed through the main coil 822 for primary purpose of performing track following, e.g., such as in the present case, may be considered a "track following current" as used herein. However, due to the basic design of the main coil 822, only certain portions of the main coil 822 generate force(s) along the fine motion direction 818 to induce motion of the head carriage assembly 804 therealong. Specifically, according to the illustrative embodiment of FIGS. 8A-8B, the horizontal legs of the main coil 822 (oriented along the intended direction of media movement 807) may be used to generate force(s) along the fine motion direction 818.

As would be appreciated by one skilled in the art upon reading the present description, the horizontal legs of the main coil 822 are in the presence of a magnetic field and a force generated upon energization thereof, produces a resultant Lorentz's force along the fine motion direction 818. Thus, by the use of Lorentz's forces, a relative motion of the beam 803, e.g., with respect to a magnetic medium, may be generated and preferably used for track following.

However, the other portions of the main coil 822, e.g., the vertical legs oriented along the fine motion direction 818, do not contribute to the forces generated by the horizontal legs of the main coil 822. This results from the orientation of the electrical current through the vertical legs of the main coil 822 not being constructively paired with the magnetic field generated by the hard magnets 828 of the fine motion motor 814, as would be appreciated by one skilled in the art upon reading the present description.

Accordingly, supplemental coils 824 and pole pieces 826 have been added to the fine motion motor 814 in the present embodiment to achieve additional functionality, as alluded to above. This design allows the supplemental coils 824 and pole pieces 826 to utilize the current existing in the vertical legs of the main coil 822 to generate side forces and create a desired amount of skew motion. This may be achieved by adding the pole pieces 826 on either side of the main coil 822, and passing a second current through the supplemental coils 824. In view of the currents generated in the supplemental coils 824, the added pole pieces 826 may generate magnetic fields proportional to the current used for track following and/or proportional to the second current used therein. In other words, the supplemental coils 824 and the pole pieces 826 are configured in the present embodiment to induce skew motion of the head carriage assembly 804 about the axis of skew 820, independent of fine motion in the fine motion direction 818. It should be noted that, depending on the desired embodiment (e.g., the extent of skew motion), the same, similar or different currents may be passed through each of the supplemental coils 824.

Referring still to FIGS. 8A-8B, the second current passed through the supplemental coils 824 generates a magnetic field in the gaps of the side pole pieces 826 which in turn interact with the track following current being passed through the vertical legs of the main coil 822. This interaction generates a force along the intended direction of media movement 807 which may thereby cause the head carriage assembly 804 to rotate about the pivot pin 830 at the axis of skew 820. It should be noted that the pivot pin 830 is shown by way of example only, and is in no way intended to limit the invention. According to other embodiments, flexures may be used to supplement and/or replace the pivot pin 830.

The two skew motion motors 816 are preferably configured to supplement each other in rotatably positioning the head carriage assembly about the axis of skew 820, as described above. Accordingly, the two skew motion motors 816 may generate forces on the beam 803 which are oriented in the same, or similar direction, thereby constructively interacting with each other to skew the head. However, in another approach, the two skew motion motors 816 may generate forces on the beam that oppose each other, whereby independent control of the supplemental coils produces a resultant net force that is smaller than achievable by one of the skew motion motors 816 alone.

The forces generated from both the vertical (oriented along the fine motion direction 818) and the horizontal (oriented along the intended direction of media movement 807) force vectors will cause the head carriage assembly 804 to move in a track following motion and skew motion as desired, thereby allowing for both operations to be performed, e.g., simultaneously. However, according to some approaches, the ability to disable skew following may be desired, e.g., when no skew error signal is received. Thus, the current supplied to the supplemental coils 824 may be disabled when skew following is not desired (e.g., needed).

In other embodiments, the ability to disable track following may be desired, e.g., when no position error signal is received. Thus, the current supplied to the fine motion motor 814 may be disabled when track following is not desired (e.g., needed). However, the particular embodiment illustrated in FIGS. 8A-8B is configured such that skew following cannot be performed exclusively. In other words, in order to perform skew following, a current is applied to the main coil 822 which results in track following motion in addition to skew following, e.g., regardless of whether track following motion is desired or not. It follows that in some embodiments, the ability to induce the fine motion independent of the skew motion may be desired.

Figure 9:
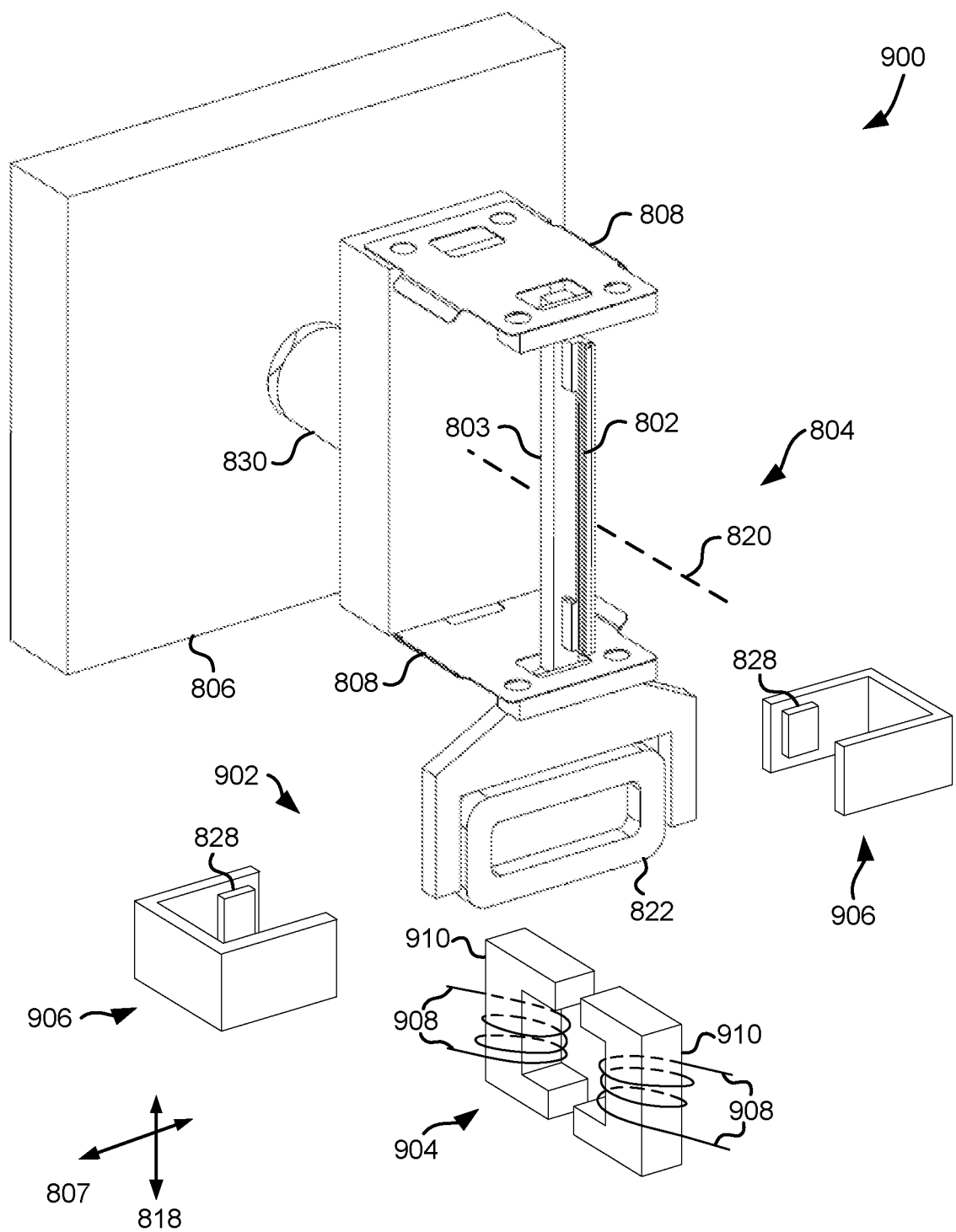
FIG. 9 is an exploded, partial perspective view of an apparatus according to one embodiment.

FIG. 9 depicts an apparatus 900, in accordance with one embodiment. As an option, the present apparatus 900 may be implemented in conjunction with features from any other embodiment listed herein, such as those described with reference to the other FIGS., such as FIGS. 1A-8B. Specifically, FIG. 9 illustrates variations of the embodiment of FIGS. 8A-8B depicting several exemplary configurations within an exploded view of an apparatus 900. Accordingly, various components of FIG. 9 have common numbering with those of FIGS. 8A-8B.

However, such apparatus 900 and others presented herein may be used in various applications and/or in permutations which may or may not be specifically described in the illustrative embodiments listed herein. Further, the apparatus 900 presented herein may be used in any desired environment. Thus FIG. 9 (and the other FIGS.) may be deemed to include any possible permutation.

Referring now to FIG. 9, apparatus 900 is illustrated as having an actuator assembly 902 which is coupled to the beam 803 of the head carriage assembly 804. Actuator assembly 902 includes fine motion motor 904 as well as skew motion motors 906. It should be noted that although two skew motion motors 906 are included in the present embodiment, in other embodiments only one skew motion motor 906 may be included, e.g., depending on a desired amount of skew motion, a weight of the head carriage assembly 804, a velocity of tape implemented during run time, etc.

Fine motion motor 904 is shown as including supplemental coils 908 and pole pieces 910 while the skew motion motors 906 include hard magnets 828 and no coil(s). Supplemental coils 908 may be considered a "coil set" in some approaches as coil windings encircle both of the pole pieces 910. Although it is preferred that the same or similar currents are applied to either of the supplemental coils 908, different currents may be applied to either of the supplemental coils 908 in some approaches. Moreover, as mentioned above, hard magnets 828 may include any suitable magnetic material which would be apparent to one skilled in the art upon reading the present description.

According to the present embodiment, the supplemental coils 908 and pole pieces 910 are preferably configured to induce the fine motion independent of the skew motion. According to an example, which is in no way intended to limit the invention, a current may be passed through the main coil 822 which directly interacts with the magnetic field supplied by the hard magnets 828 of the skew motion motors 906 to generate forces about the axis of skew 820 for skew following during operation. Thus, the current passed through the main coil 822 for primary purpose of performing skew following, e.g., such as in the present case, may be considered a "skew following current". However, as mentioned above, due to the basic design of the main coil 822, only certain portions of the main coil 822 generate force(s) about the axis of skew 820 to induce such motion of the head carriage assembly 804. Specifically, according to the illustrative embodiment of FIG. 9, the vertical legs of the main coil 822 (oriented along the fine motion direction 818) may be used to generate force(s) along the intended direction of media movement 807, and accordingly about the axis of skew 820.

As would be appreciated by one skilled in the art upon reading the present description, the vertical legs of the main coil 822 generate a force when in the presence of a magnetic field upon energization thereof. Furthermore, the vertical legs of the main coil 822 are in the presence of a magnetic field supplied by the skew motion motors 906, the magnetic field interacting with the current passing in the main coil 822 upon energization thereof to produce a resultant Lorentz's force along the intended direction of media movement 807. Thus, by the use of Lorentz's forces, a relative rotational motion of the beam 803, e.g., with respect to a magnetic medium, may be generated and preferably used for skew following.

However, the other portions of the main coil 822, e.g., the horizontal legs oriented along intended direction of media movement 807, do not contribute to the forces generated by the horizontal legs of the main coil 822. This results from the current passing through the horizontal legs of the main coil 822 not being constructively paired with the magnetic field generated by the hard magnets 828 of the skew motion motors 906, as would be appreciated by one skilled in the art upon reading the present description.

Accordingly, supplemental coils 908 and pole pieces 910 have been added to the fine motion motor 904 in the present embodiment to achieve additional functionality as alluded to above. This design allows the supplemental coils 908 and pole pieces 910 to utilize the current from the horizontal legs of the main coil 822 in combination with the skew following current passing through the main coil 822 to generate forces and create a desired amount of motion along the fine motion direction 818. In other words, the supplemental coils 908 and the pole pieces 910 are configured in the present embodiment to induce fine motion of the head carriage assembly 804 independent of skew motion. This may be achieved by passing a second current through the supplemental coils 908. In view of the currents generated in the supplemental coils 908, the added pole pieces 910 may be able to generate magnetic fields proportional to the current used for skew following and/or proportional to the second current used therein.

Referring still to FIG. 9, the second current passed through the supplemental coils 908 generates a magnetic field in the gaps of the side pole pieces 910 which in turn interact with the skew following current being passed through the horizontal legs of the main coil 822, e.g., as described above.

Again, the forces generated from both the vertical (oriented along the fine motion direction 818) and the horizontal (oriented along the intended direction of media movement 807) force vectors cause the head carriage assembly 804 to move in a track following motion and skew motion as desired, thereby allowing for both operations to be performed, e.g., simultaneously. It follows that different amounts of current may be applied in different situations, e.g., depending on the desired amount and/or type of movement for the head carriage assembly 804. Accordingly, any one or more of the following operations of method 1000 may be performed when determining an amount of current to apply to a given coil as described in the different embodiments herein.

Figure 10:
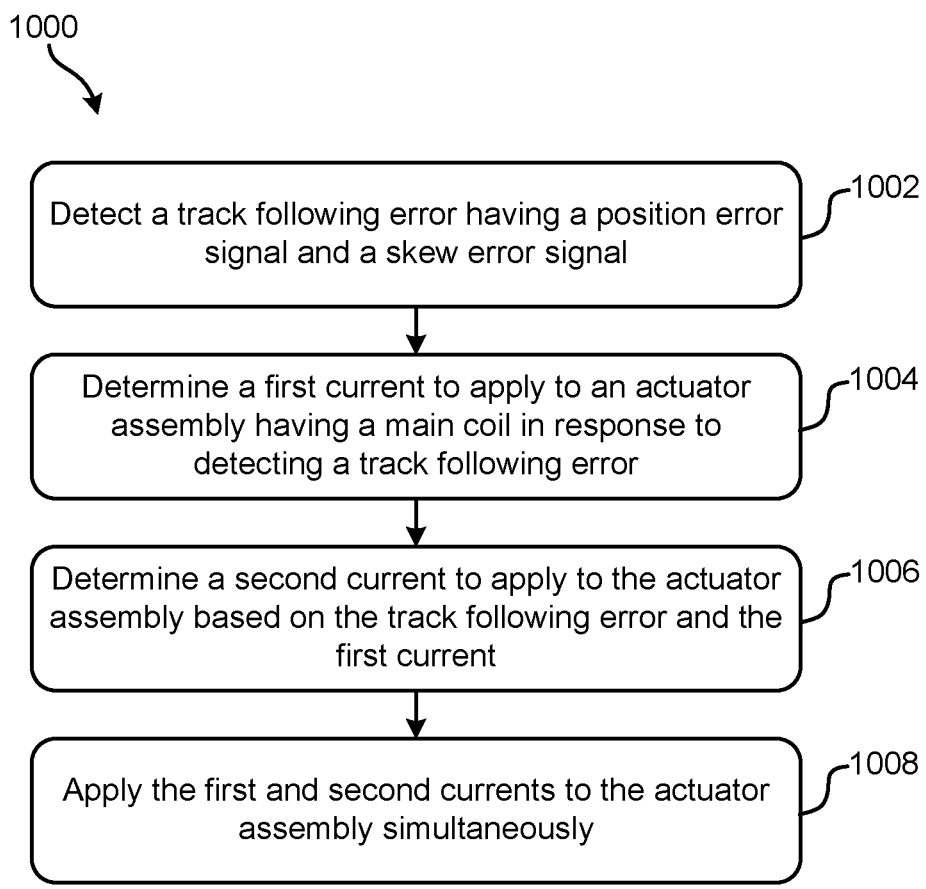
FIG. 10 is a flowchart of a method according to one embodiment.

FIG. 10 illustrates a flowchart of a method 1000 according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 includes operation 1002, where a track following error is detected. Depending on the positional status of a tape being read from and/or written to, the track following error may include a position error signal (PES) and/or a skew error signal (SES). The track following error may be derived from servo tracks, e.g., associated with a magnetic medium being read from and/or written to, as would be appreciated by one skilled in the art upon reading the present description.

Moreover, operation 1004 includes determining a first current to apply to the main coil of an actuator assembly in response to detecting a track following error. The first current may be determined based on one or more of several factors which include: a PES value, a SES value, configuration of the skew motion motor, configuration of the fine motion motor, etc.

As described above, a main coil (e.g., main planar coil) of the actuator assembly is preferably configured to induce skew motion and/or lateral motion of at least a portion of a head carriage assembly, e.g., relative to a magnetic medium upon energization thereof. Thus, the main coil may be positioned such that the forces generated by the currents passing therethrough when energized, control the position of at least a portion of the head carriage assembly by generating an electromagnetic field which is thereby applied to fine and skew motion motors. Accordingly, tape skew and/or tape lateral motion in the cross-track direction may be compensated for by causing motion of at least a portion of the head carriage assembly about an axis of skew and/or along the fine motion direction.

It follows that, depending on a PES value and/or an SES value which may be derived from the track following error, an amount of current passed through the main coil may be determined to result in an amount of motion of the head carriage assembly to compensate for such a PES value and/or a SES value. For example, greater PES and/or SES values may correspond to greater amounts of current applied to the main coil while lesser PES and/or SES values may correspond to lesser amounts of current applied to the main coil. However, the configuration of the motors used to achieve such motion also affects the determination of the first current. Referring back to apparatus 800 of FIGS. 8A-8B, the skew motion motors 816 are shown as including a supplemental coil 824 and a pole piece 826 while the fine motion motor 814 includes hard magnets 828 and no coil. Accordingly, a current may be passed through the main coil 822 to generate forces along the fine motion direction 818 for the primary purpose of performing track following during operation. In such embodiments, a first current to apply to a main coil of an actuator assembly may be determined (e.g., see operation 1004) primarily based on a PES value.

Alternatively, referring back to apparatus 900 of FIG. 9, the fine motion motor 904 is shown as including supplemental coils 908 and pole pieces 910 while the skew motion motors 906 include hard magnets 828 and no coils. Accordingly, a current may be passed through the main coil 822 to generate forces about the axis of skew 820 for the primary purpose of performing skew error corrections during operation. In such embodiments, a first current to apply to a main coil of an actuator assembly may be determined (e.g., see operation 1004) primarily based on a SES value.

With continued reference to FIG. 10, operation 1006 includes determining a second current to apply to the actuator assembly based on a portion of the track following error and the first current. As mentioned above, the track following error may include a PES and/or a SES. Moreover, depending on the configuration of the motors included in a given embodiment, the first current determined in operation 1004 may be based on one of the PES and SES. It follows that the second current may be based on the other of the PES and SES such that it may be compensated for.

As described above, supplemental coils and pole pieces are included in some of the embodiments described herein to achieve additional functionality by utilizing portions of the main coil. This may be achieved by adding one or more pole pieces adjacent the main coil, and passing the second current through one or more supplemental coils associated with the one or more pole pieces, thereby generating a magnetic field in the gaps of the side pole pieces, which in turn interact with the first current being passed through the main coil. Thus, the second current determined in operation 1006 is preferably based on a portion of the track following error and the first current.

Referring still to FIG. 10, the second current may be applied in different manners depending on the configuration of the motors used in a given embodiment. As described above, the supplemental coils and pole pieces are may be configured to induce fine or skew motion of at least a portion of the head carriage assembly independent of skew or fine motion, respectively. It follows that the configuration of the motors used to achieve such motion also affects the determination and/or application of the second current.

Referring back to apparatus 800 of FIGS. 8A-8B, the skew motion motors 816 are shown as including a supplemental coil 824 and a pole piece 826 while the fine motion motor 814 includes hard magnets 828 and no coil. Accordingly, a current may be passed through the main coil 822 to generate forces along the fine motion direction 818 for the primary purpose of performing track following during operation. In such embodiments, a first current to apply to a main coil of an actuator assembly may be determined (e.g., see operation 1004) primarily based on a PES value.

Moreover, the second current may be applied to the skew motion motors in embodiments where the skew motion motor includes supplemental coils and pole pieces, e.g., as seen in FIGS. 8A-8B. Accordingly, the second current may be adjusted based on the first current and a SES derived from the track following error. In some approaches, the adjustments to the second current may be made dynamically, e.g., during run time to account for changes in real time.

Alternatively, referring back to apparatus 900 of FIG. 9, the fine motion motor 904 is shown as including supplemental coils 908 and pole pieces 910 while the skew motion motors 906 include hard magnets 828 and no coils. Accordingly, a current may be passed through the main coil 822 to generate forces about the axis of skew 820 for the primary purpose of performing skew error corrections during operation. In such embodiments, a first current to apply to a main coil of an actuator assembly may be determined (e.g., see operation 1004) primarily based on a SES value.

Furthermore, the second current may be applied to the fine motion motor in embodiments where the fine motion motor includes supplemental coils (e.g., a coil set) and a pole pieces, e.g., as seen in FIG. 9. Accordingly, the second current may be adjusted based on the first current and a PES derived from the track following error. Again, the adjustments to the second current may be made dynamically in some approaches, e.g., during run time to account for changes in real time.

Again, the forces generated from both the skew motion motors and the fine motion motor produce force vectors which cause at least a portion of the head carriage assembly to move in a track following motion and skew motion as desired, thereby allowing for both types of movement to be performed, e.g., simultaneously. However, according to some approaches, the absence of a PES or SES may be detected. In such approaches, a current may be applied relative to a fine motion motor or the skew motion motors which negates motion caused by the other.

According to an example, which is in no way intended to limit the invention, a track following error having a large SES, but no PES may be detected. It follows that a large amount of skew motion is preferably induced to compensate for the SES. However, it is also greatly desired that the skew motion does not affect the lateral position of the head carriage assembly with respect to a magnetic medium, e.g., along the cross-track direction. Thus, the second current supplied to the supplemental coils and pole pieces may be adjusted accordingly. In some approaches the second current may be disabled to prevent any induced motion of the head carriage assembly along the cross-track direction, while in other approaches, the second current may proactively cause motion of the head carriage assembly relative to a magnetic medium or cause motion of the head carriage assembly to prevent motion of the head carriage assembly relative to a magnetic medium.

Referring again to FIG. 10, method 1000 additionally includes operation 1008 where the first and second currents are applied to the actuator assembly simultaneously, e.g., by a controller. It is preferred that the first and second currents are applied to the actuator assembly simultaneously or substantially simultaneously to prevent any disconnect between motion of the head carriage assembly in the fine motion direction and about the axis of skew. In other words, if the second current is determined based at least in part on the first current, any unanticipated or unplanned delay between the application of the first and second currents may degrade the resulting effect of the currents and overall performance of the system. However, in some approaches, an anticipated delay in the application of the first and second currents may be accounted for and implemented.

Again, by implementing actuator configurations which achieve multiple directions of motion using only a single main coil assembly as described in various embodiments herein, performance is desirably improved.

It should also be noted that although many of the embodiments herein are described in terms of magnetic tape, similar and/or the same results may be achieved by implementing flexures with actuators of different media and/or applications to achieve the reduction of pitching motion thereof. Thus, the various embodiments described herein are in no way limited to implementations which include magnetic tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a computer readable storage medium having program instructions embodied therewith, the program instructions readable and/or executable by a controller to cause the controller to:
   determine, by the controller, first and second currents to apply to an actuator assembly in response to detecting a track following error; and
   apply, by the controller, the first and second currents to the actuator assembly simultaneously,
   wherein the actuator assembly includes:
      a fine motion motor for enabling positioning of a beam of a head carriage assembly along a fine motion direction, the fine motion direction being oriented perpendicular to an intended direction of media movement;
      a skew motion motor for enabling rotatable positioning of the head carriage assembly about an axis of skew which extends perpendicular to a plane defined by the intended direction of media movement across the head carriage assembly and the fine motion direction; and
      a main coil configured to induce skew motion and lateral motion of the beam of the head carriage assembly relative to the fine motion motor and the skew motion motor upon energization of the main coil,
   wherein the first current is applied to the main coil.

2. The computer program product as recited in claim 1, wherein the skew motion motor includes a supplemental coil and a pole piece, the supplemental coil and the pole piece being configured to induce the skew motion independent of the fine motion.

3. The computer program product as recited in claim 2, wherein the fine motion motor includes hard magnets.

4. The computer program product as recited in claim 1, wherein the fine motion motor includes a supplemental coil and a pole piece, the supplemental coil and the pole piece being configured to induce the fine motion independent of the skew motion.

5. The computer program product as recited in claim 4, wherein the skew motion motor includes hard magnets.

6. The computer program product as recited in claim 1, wherein the second current is applied to the skew motion motor.

7. The computer program product as recited in claim 6, the program instructions readable and/or executable by the controller to cause the controller to:
   adjust, by the controller, the second current based on a skew error signal derived from the track following error and the first current.

8. The computer program product as recited in claim 1, wherein the second current is applied to the fine motion motor.

9. The computer program product as recited in claim 8, the program instructions readable and/or executable by a controller to cause the controller to:
   adjust, by the controller, the second current based on a position error signal derived from the track following error and the first current.

10. The computer program product as recited in claim 1, wherein the actuator assembly includes a second skew motion motor positioned on an opposite side of the main coil relative to the skew motion motor.

11. The computer program product as recited in claim 1, wherein the main coil is a single coil assembly.

12. The computer program product as recited in claim 1, wherein the actuator assembly includes:
   a magnetic head mounted to the head carriage assembly; and
   a drive mechanism for passing a magnetic medium over the magnetic head,
   wherein the controller is electrically coupled to the actuator assembly.

13. A controller-implemented method, comprising:
   determining first and second currents to apply to an actuator assembly in response to detecting a track following error; and
   applying the first and second currents to the actuator assembly simultaneously,
   wherein the actuator assembly includes:
      a fine motion motor for positioning a beam of a head carriage assembly along a fine motion direction, the fine motion direction being oriented perpendicular to an intended direction of media movement;

a skew motion motor for rotatably positioning the head carriage assembly about an axis of skew which extends perpendicular to a plane defined by the intended direction of media movement across the head carriage assembly and the fine motion direction; and a main coil configured to induce skew motion and lateral motion of the beam of the head carriage assembly relative to the fine motion motor and the skew motion motor upon energization of the main coil, wherein the first current is applied to the main coil.

14. The controller-implemented method as recited in claim 13, wherein the second current is applied to the skew motion motor, wherein the skew motion motor includes a coil and a pole piece, the coil and the pole piece of the skew motion motor being configured to induce the skew motion independent of the fine motion.

15. The controller-implemented method as recited in claim 14, wherein the fine motion motor includes hard magnets.

16. The controller-implemented method as recited in claim 13, wherein the second current is applied to the fine motion motor, wherein the fine motion motor includes a coil and pole pieces, the coil and the pole pieces of the fine motion motor being configured to induce the fine motion independent of the skew motion.

17. The controller-implemented method as recited in claim 16, wherein the skew motion motor includes hard magnets.

18. The controller-implemented method as recited in claim 13, wherein the main coil is a single coil assembly.

19. The controller-implemented method as recited in claim 13, wherein the actuator assembly includes:

a second skew motion motor positioned on an opposite side of the main coil relative to the skew motion motor.

20. The controller-implemented method as recited in claim 13, wherein the actuator assembly includes:

a magnetic head mounted to the head carriage assembly; and a drive mechanism for passing a magnetic medium over the magnetic head, wherein the controller is electrically coupled to the actuator assembly.

* * * * *